United States Patent [19]
Moriguchi et al.

[11] Patent Number: 5,690,838
[45] Date of Patent: Nov. 25, 1997

[54] MAGNETIC RECORDING MEDIUM AND PROCESS FOR PRODUCING SAME

[75] Inventors: Yoshihiro Moriguchi, Hiratsuka; Youichi Inomata; Hiroshi Yashiki, both of Odawara; Yoshiki Kato, Tokyo; Kenichi Gomi, Hitachi; Hideaki Tanaka, Katsuta, all of Japan

[73] Assignee: Hitachi, Ltd., Tokyo, Japan

[21] Appl. No.: 460,928

[22] Filed: Jun. 5, 1995

Related U.S. Application Data

[63] Continuation of Ser. No. 279,931, Jul. 25, 1994, abandoned, and a continuation-in-part of Ser. No. 198,592, Feb. 18, 1994, and Ser. No. 077,874, Jun. 18, 1993, Pat. No. 5,504,646.

[51] Int. Cl.$^6$ .................... B44C 1/22; G11B 5/72
[52] U.S. Cl. .................... 216/22; 216/67; 216/81; 360/131; 360/135
[58] Field of Search .................... 216/22, 67, 42, 216/49, 81

[56] References Cited

U.S. PATENT DOCUMENTS

| | | | |
|---|---|---|---|
| 5,202,810 | 4/1993 | Nakamura et al. | 360/135 |
| 5,285,343 | 2/1994 | Tanaka et al. | 360/131 |
| 5,322,595 | 6/1994 | Sato et al. | 156/643 |
| 5,353,182 | 10/1994 | Nakamura et al. | 360/104 |
| 5,388,020 | 2/1995 | Nakamura et al. | 360/135 |
| 5,411,630 | 5/1995 | Nagase et al. | 216/22 |

*Primary Examiner*—R. Bruce Breneman
*Assistant Examiner*—Michael E. Adjodha
*Attorney, Agent, or Firm*—Antonelli, Terry, Stout & Kraus, LLP

[57] ABSTRACT

A magnetic recording medium excellent in corrosion resistance and rubbing reliability is realized by forming a number of concavities and convexities on the surface of a protective layer formed on a substrate and applying dry etching with a noble gas after the formation of the concavities and convexities to form a modified layer having hydrophobic nature on the surface of the protective layer.

24 Claims, 4 Drawing Sheets

MAGNETIC RECORDING MEDIUM AND PROCESS FOR PRODUCING SAME

This is a continuing application of U.S. application Ser. No. 08/279,931, filed Jul. 25, 1994 abandoned and a continuation-in-part application of U.S. application Ser. No. 08/198,592, filed on Feb. 18, 1994, and a continuation-in-part application of U.S. application Ser. No. 08/077,874, filed on Jun. 18, 1993 U.S. Pat. No. 5,504,646, the subject matter of each of the aforementioned applications being incorporated by reference herein.

BACKGROUND OF THE INVENTION

This invention relates to a magnetic recording medium and a process for producing the same. More particularly, it relates to a magnetic recording medium excellent in tackiness between magnetic head and magnetic recording medium and further in corrosion resistance and rubbing reliability and to a process for producing the same. The "tackiness" means a phenomenon that a slider head is pasted on a disk by face-to-face, so that the slider dose not separate from the disk surface.

DESCRIPTION OF RELATED ART

As disclosed in Japanese Patent Application Kokai No. 3-127.327, the conventional magnetic recording medium in which a protective layer having formed thereon concavities and convexities is present on a magnetic layer can be allowed to have improved floating properties and tackiness. However, in order to allow the magnetic recording medium to have reliability over a longer period of time, it is necessary to further improve the corrosion resistance of the protective film.

According to the conventional etching method capable of efficiently forming the surface shape of the protective film, there is a problem that the deterioration of corrosion resistance of the protective film is caused.

On the other hand, when an etching method by which the deterioration of corrosion resistance of the protective film is little caused is adopted, the etching efficiency and the etching control are not sufficient and the productivity becomes low.

SUMMARY OF THE INVENTION

An object of this invention is to provide a magnetic recording medium which is excellent in tackiness between magnetic head and magnetic recording medium and also in corrosion resistance and rubbing reliability.

Another object of this invention is to provide a production process for realizing the above magnetic recording medium.

Other objects and advantages of this invention will become apparent from the following description.

According to this invention, there is provided a magnetic recording medium comprising a substrate, a magnetic layer formed on the substrate, a protective layer formed on the magnetic layer for protecting the same, a modified layer having hydrophobic nature formed on the protective layer and a lubricating layer formed on the modified layer. The modified layer can be formed by subjecting the surface of the protective layer to dry etching with, for example, a noble gas, and hence, can function as a hydrophobic layer.

This invention further provides a process for producing the above magnetic recording medium which comprises forming a magnetic layer on a substrate, forming a protective layer on the magnetic layer for protecting the same, forming a modified layer having hydrophobic nature on the protective layer and forming a lubricating layer on the modified layer.

If the protective layer formed for protecting the above magnetic layer is taken as a first protective layer, the modified layer can be taken as a second protective layer having hydrophobic nature because the modified layer is a layer formed by modifying the first protective layer by, for example, dry etching.

The above modified layer having hydrophobic nature on the protective layer can also be formed by other methods, for example, by ion-infusion with nitrogen, ion-milling with carbon or boron and calcining at a temperature of 100° to 300° C.

The modified layer thus formed has water-repelling properties, so that the corrosion resistance of the magnetic layer of the magnetic recording medium is enhanced. Moreover, the said treatment simultaneously enhances the resistivity of the protective layer surface, whereby the resistance to corrosion due to local-battery formation is increased. As a result, the corrosion resistance is improved and it becomes possible to provide a magnetic recording medium having high reliability.

It is also possible to form a number of concavities and convexities on the protective layer and also form on the modified layer concavities and convexities corresponding to the shapes of the concavities and convexities on the protective layer, whereby the tackiness between magnetic head and magnetic recording medium can be improved. Accordingly, a magnetic recording medium having improved tackiness and excellent corrosion resistance can be realized.

The method of forming concavities and convexities on the protective layer comprises randomly applying a microscopic masking material onto the protective layer, and subjecting the protective layer to dry etching with oxygen using alternating-current discharge. Incidentally, "a microscopic masking material" is used in the present specification as a general term of the material which works as a masking material, such as a resin particle mask and a lubricating agent.

BRIEF DESCRIPTION OF THE DRAWINGS

The invention will be described in conjunction with certain drawings which are the purpose of illustrating preferred and alternate embodiments of the invention only, and not for the purpose of limiting the same, and wherein.

DETAILED DESCRIPTION OF THE PREFERRED AND ALTERNATE EMBODIMENTS

Examples of this invention are explained below referring to the accompanying drawings.

Figure 1:
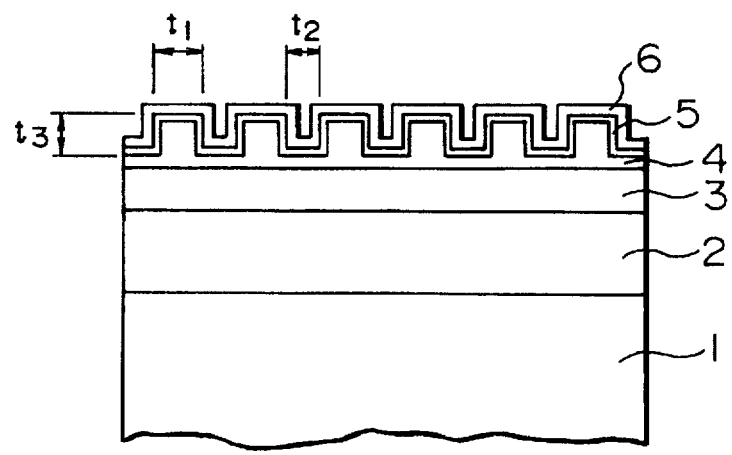
FIG. 1 is a sectional view showing an example of the magnetic recording medium of this invention.
Figure 2:
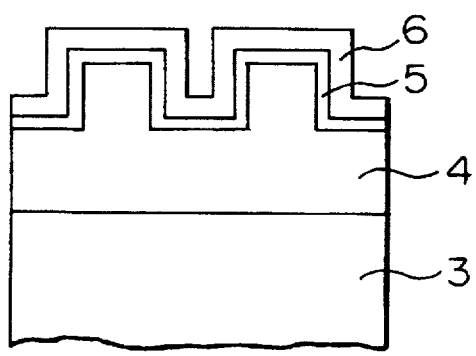
FIG. 2 is a partially enlarged sectional view of the magnetic recording medium shown in FIG. 1.

FIG. 1 is a sectional view showing the construction of an example of the magnetic recording medium of this invention, and FIG. 2 is a partially enlarged view of the first example shown in FIG. 1. The example of magnetic recording medium shown in FIG. 1 is composed of an aluminum substrate 1, an intermediate layer 2 formed on the aluminum substrate 1, a Co—Cr type magnetic layer 3 formed on the intermediate layer 2, and a carbon-protective layer 4 formed on the magnetic layer 3, and on the surface of the carbon protective layer 4, there are formed a number of concavities and convexities Also, these concavities and convexities are formed so as to have a diameter t1 in the range of 0.1 to 10 μm, a distance t2 between convexity and convexity in the range of 3 to 120 μm, a difference t3 of altitude of concavity and convexity in the range of 5–30 nm. On the surface of the carbon protective layer 4 on which the above concavities and convexities are formed, a modified layer 5 is formed. Further, a lubricating layer 6 is formed by coating a lubricating agent comprising polytetrafluoroethylene (PTFE) as the main material.

The surface of the above modified layer exhibits hydrophobic nature and has such properties that the contact angle to water is 45 to 70 deg. and the contact angle to glycerin is 35 to 55 deg. Also, the resistivity of the protective layer 4 is about $10^6$ to $10^7$ Ωcm before the modification and becomes more than $10^7$ Ωcm after the formation of the modified layer 5, from which it is seen that the corrosion resistance of the protective layer 4 has been improved.

Incidentally, in the magnetic recording medium, needless to say, the aluminum substrate 1 may be nickel-phosphorus-plated and the intermediate layer 2 may be absent.

Figure 3:
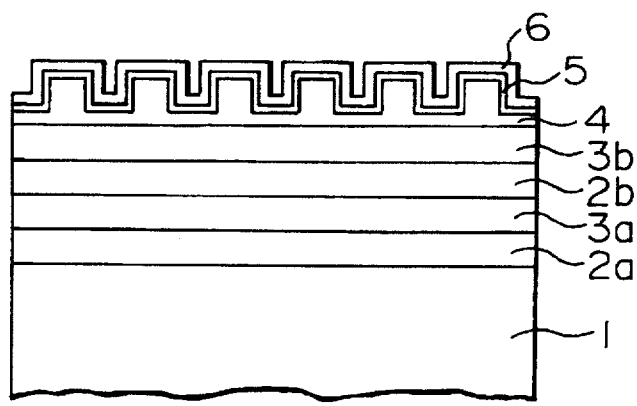
FIG. 3 is a sectional view showing a modified example of the magnetic recording medium shown in FIG. 1.

Moreover, as shown in FIG. 3, the magnetic layer may be of a double or more multiple layer type of the first magnetic layer 3a, the second intermediate layer 2a and the second magnetic layer 3b.

Figure 4A:
FIGS. 4A–4F are explanatory views showing a process for producing the magnetic recording medium shown in FIG. 1.
Figure 4B:
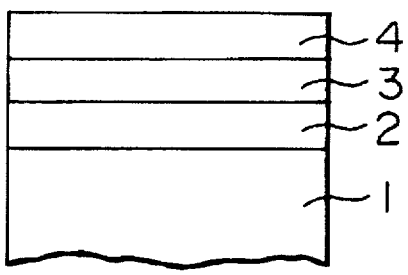
Figure 4C:
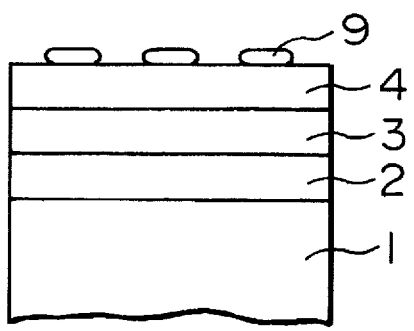
Figure 4D:
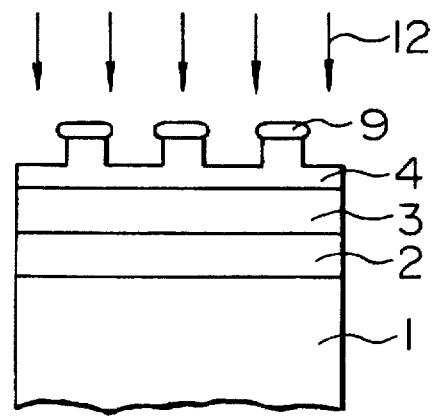
Figure 4E:
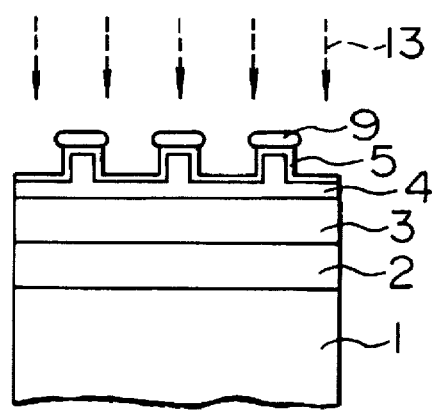
Figure 4F:
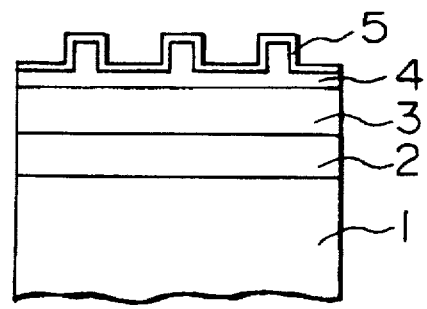

An explanation is made below of a process for producing the magnetic recording medium shown in FIG. 1. FIG. 4 is an explanatory view showing the sectional view of the magnetic recording medium for illustrating the process for producing the magnetic recording medium shown in FIG. 1. FIG. 4A is a sectional view of the aluminum substrate 1. This aluminum substrate 1 is nickel-phosphorus-plated and a concentric circle or mesh texture having a surface roughness Ra of 5 nm or less is further formed thereon (not shown). Incidentally, "texture" means a processing made on the surface of substrate. Subsequently, as shown in FIG. 4B, an intermediate layer 2, and a Co—Cr type magnetic layer 3 can be made by plating. Then, as shown in FIG. 4C, a resin particle mask 9 is applied onto the carbon protective layer 4. The resin particle mask 9 is a masking material consisting of solid particles of which principal component is resin. In this case, as the resin particle mask 9, for example, a mask material consisting essentially of polytetrafluoroethylene (PTFE) is used. Of course, a resist may be used in place of the resin particle mask. After the application of the resin particle mask, as shown in FIG. 4D, dry etching by alternating-current discharge (RF discharge) is applied to the surface of the carbon protective layer 4 using an etching gas consisting essentially of oxygen 12 to form concavities and convexities on the surface of the carbon protective layer 4. This etching is conducted under such conditions that the gas pressure is 0.3 Torr, the gas flow rate is 200 SCCM and RF power is 200 W. Further, as shown in FIG. 4E, the surface of the carbon protective layer 4 is subjected to dry etching with argon 13 to form a modified layer 5. Subsequently, the resin particle mask 9 which has been made useless is removed. This etching is conducted under such conditions that the gas pressure is 0.3 Torr, the gas flow rate is 200 SCCM and the making power is 200 W. Thus, as shown in FIG. 4F, the magnetic recording medium is completed. In addition, a lubricating layer 6 is formed on the surface of the modified layer 5.

Another process for producing the magnetic recording medium shown in FIG. 1 is explained below. In this case, the lamination of the aluminum substrate 1, the intermediate layer 2, the magnetic layer 3 and the carbon protective layer 4 is the same as in the steps shown in FIGS. 4A and 4B. After the formation of the carbon protective layer 4, the lubricating agent is applied in the form of droplets having a diameter of 0.5 to 10 μm onto the carbon protective layer 4 as a mask. Thereafter, the lubricating agent layer formed is dry etched with an etching gas consisting essentially of oxygen (pressure: 0.3 Torr, gas flow rate: 200 SCCM, making power: 200 W) to form concavities and convexities on the lubricating agent layer. In addition, the surface of the carbon protective layer 4 is dry etched with argon (pressure: 0.3 Torr, gas flow rate: 200 SCCM and making power: 200 W) to complete the magnetic recording medium. In this case, the removal of the mask and the formation of the lubricating layer can be omitted, so that the production process can be greatly simplified. Of course, a lubricating agent may be applied again onto the completed magnetic recording medium. Incidentally, as the lubricating agent used as a mask, a high molecular weight type lubricating agent such as perfluoropolyether type lubricating agent is excellent in respect of plasma resistance.

According to the example shown in FIG. 4, the step of forming concavities and convexities on the surface of the protective layer 4 and the step of modifying the surface of the protective layer 4 can be separated, and by the optimum combination of the steps shown in FIG. 4, there can be provided a magnetic recording medium and a magnetic recording device excellent in tackiness, corrosion resistance and rubbing reliability.

A further process for producing the magnetic recording medium shown in FIG. 1 is explained below. Onto an aluminum substrate 1 which has undergone a nickel-phosphorus-plating is applied a concentric circle or mesh texture having a surface roughness Ra of 5 nm or less, and thereafter, an intermediate layer 2, a magnetic layer 3 and a carbon protective layer 4 are formed by continuous sputtering-layering or multilayer-plating. Subsequently, a resin particle mask is coated on the carbon protective layer 4. Then, a number of concavities and convexities are formed using dry etching with a nobel gas or ion-milling with carbon or boron, and simultaneously with the formation of concavities and convexities, a modified layer 5 is formed. Moreover, a lubricating agent is applied thereto to form a lubricating layer 6. According to this method, the formation of concavities and convexities and the formation of the modified layer 5 are simultaneously effected, so that the step of improving the corrosion resistance can be omitted to simplify the production process. As a still further production process, a step of calcining at a temperature of 100° to 300° C. may be used in order to improve the corrosion resistance after the surface processing of the protective layer 4. This is considered to be because the O atom of the C—O bond or C=O bond formed by the dry etching is substituted by H by the calcining, whereby the protective surface is made hydrophobic.

According to the production processes explained above, the optimum combination of the above-mentioned steps can be selected by separating the step of forming concavities and convexities on the surface of the protective layer 4 from the step of modifying the surface of the protective layer 4 or by achieving the formation of concavities and convexities and the formation of the modified layer in one step, whereby a magnetic recording medium and a magnetic recording device which are excellent in floating property, tackiness, corrosion resistance and rubbing reliability can be provided.

Figure 5:
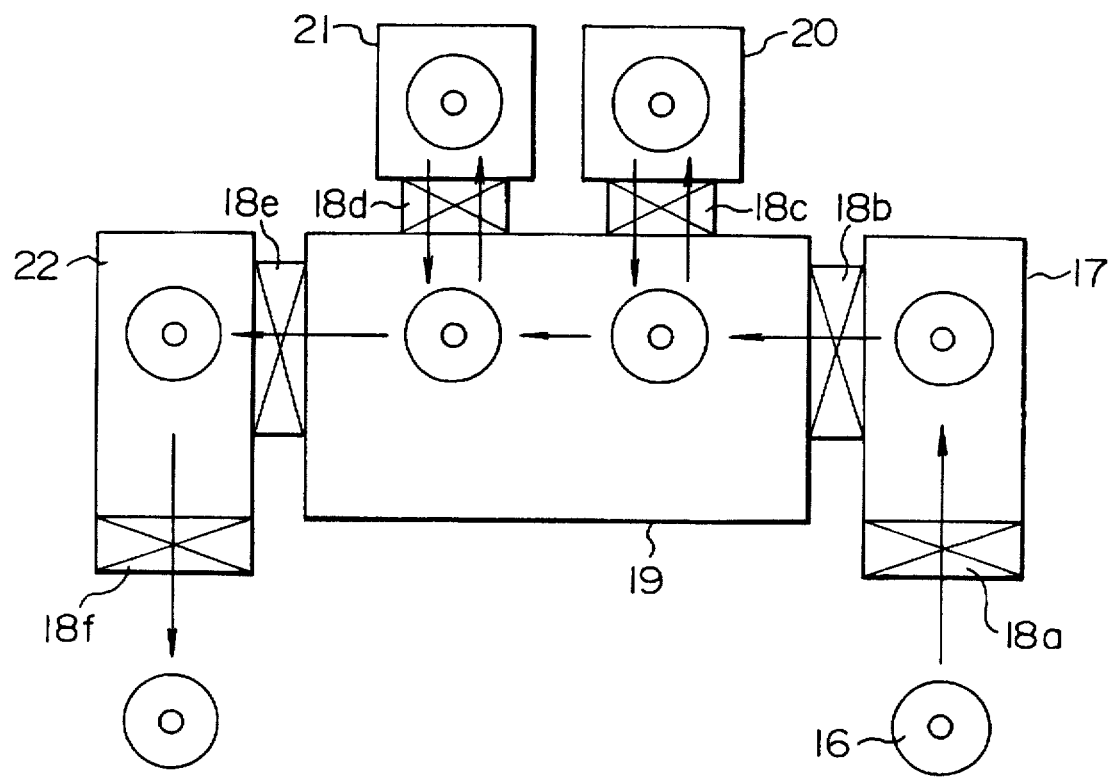
FIG. 5 is an explanatory view showing an example of an apparatus for producing the magnetic recording medium.

FIG. 5 is an explanatory view showing an example of an apparatus for producing the magnetic recording medium of this invention. The apparatus shown in FIG. 5 is for carrying out the production process shown in FIG. 4. In FIG. 5, a work 16 is a laminate of the aluminum substrate 1, the intermediate layer 2, the magnetic layer 3 and the carbon protective layer 4. First of all, the work 16 is put in a loader chamber 17 and thereafter a gate valve 18a is closed, after which the loader chamber 17 is evacuated. When the rough evacuation of the loader chamber 17 has been completed, a gate valve 18b is opened and the work 16 is transferred to a carrier vacuum chamber 19. The work 16 is further transferred from the carrier vacuum chamber 19 to an exclusive use chamber for oxygen-etching 20, after which a gate valve 18c is closed and the oxygen-etching is conducted. After the oxygen-etching has been completed, the work 16 is transferred to the carrier vacuum chamber 19 and then to an exclusive use chamber for argon-etching 21. After the closing of a gate valve 18d, argon-etching is conducted. After the completion of the argon-etching, the work 16 is transferred to the carrier vacuum chamber 19 and then to an unload chamber 22. Thereafter, a gate valve 18e is closed and air-removal is conducted in the unload chamber 22. After completion of the air-removal, a gate valve 18f is opened and the work 16 is taken out.

Incidentally, though not shown, the apparatus may be so designed that the oxygen-etching and the noble gas-etching are continuously carried out in one and same vacuum chamber provided with a means for changing the gas introduced into the vacuum chamber from oxygen to a noble gas but provided with neither the exclusive use chamber for oxygen-etching 20 nor the exclusive use chamber for argon-etching 21.

Figure 6:
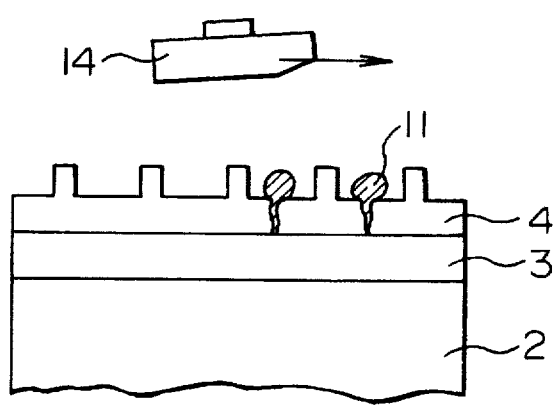
FIG. 6 is a view diagrammatically showing the positional relation between the magnetic recording medium and the magnetic head.

An explanation is made below of an example of a magnetic recording device equipped with the magnetic recording medium of this invention referring to FIGS. 6 and 7. FIG. 6 shows diagrammatically the positional relation of the magnetic recording medium and the magnetic head 14. The magnetic head 14 is usually used for recording and regeneration in the state of 20–100-nm floating from the magnetic recording medium.

The magnetic recording device equipped with the magnetic recording medium of this invention does not generate corrosion deposits 11 on the surface of the carbon protective layer 4 even when it is placed under inferior ambient conditions such as high humidity atmosphere and the like, so that no floating inhibition of the magnetic head 14 due to the corrosion deposits 11 is caused, and no increase of tack strength with time is caused.

The magnetic recording medium in the above example and a conventional magnetic recording medium are allowed to stand under inferior ambient conditions such as in a high humidity atmosphere or the like and the number of corrosion deposits 11 caused on the surface of the carbon protective layer 4 is counted. As a result, it is clarified that in the magnetic recording medium of this invention, the number of the corrosion deposits caused is reduced to about 1/20 and the corrosion resistance is improved about 20 times as compared with the conventional magnetic recording medium.

Figure 7:
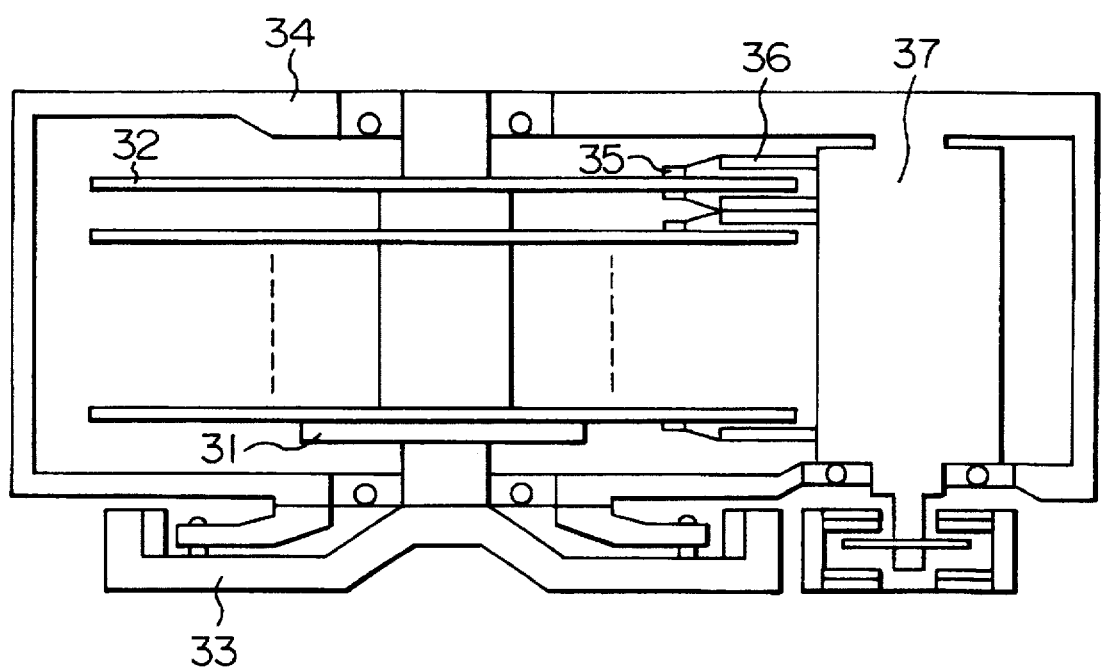
FIG. 7 is an explanatory view showing the magnetic recording apparatus equipped with the magnetic recording medium of this invention.

FIG. 7 is an explanatory view showing an example of the magnetic recording device equipped with the magnetic recording medium of this invention. As shown in FIG. 7, plural sheets of magnetic disk 32 which is the magnetic recording medium are fixed at a constant space by means of a spindle 31. One of the ends of the spindle 31 is fixed on the spindle motor 33 and the other end is rotatably supported in a case 34. The spindle motor 33 rotates the plural sheets of magnetic disk 32 fixed on the spindle 31 at a constant speed.

A magnetic head slider 35 equipped with the magnetic head (not shown) for the magnetic writing into and/or reading from the above magnetic disk 32 of information is changed from the contact state to the floating state in relation to the magnetic disk 32 as the number of revolutions of the magnetic disk 32 is increased. The magnetic head not shown is subjected to writing and/or reading in said floating state. The above magnetic head slider 35 is connected to an actuator 37 through a load arm 36. The actuator 37 is controlled so that the above magnetic head is aligned with any writing/reading region provided on the magnetic disk 32. Also, the spindle 31, the magnetic disk 32, the magnetic head slider 35, the load arm and the like are tightly shut into the case 34.

The above-mentioned magnetic recording device equipped with the magnetic recording medium of this invention is lower in HDD (hard disk drive) trouble due to corrosion deposits than a magnetic recording device equipped with a conventional magnetic recording medium, and is greatly improved in reliability as a magnetic recording device as compared with the conventional magnetic recording device. Also, it is clear that the rubbing reliability is increased by 1.5 times (35% reduced in tack strength with time). This effect is noticeable under the conditions that the diameters of the concavities and convexities formed on the surface of the modified layer are in the range of 0.1 to 10 μm, the difference in altitude of concavity and convexity is in the range of 5 to 30 nm and the distance between concavities is in the range of 3 to 120 μm.

What is claimed is:

1. A process for producing a magnetic recording medium which comprises forming a magnetic layer on a substrate, forming a protective layer on the magnetic layer, forming a number of concavities and convexities on the surface of the protective layer, and subsequently forming a modified layer having hydrophobicity on the protective layer by modifying the surface of the protective layer.

2. A process according to claim 1, wherein the modified layer is formed by modifying the protective layer with ion-infusion treatment with nitrogen.

3. A process according to claim 1, wherein the modified layer is formed by modifying the protective layer with ion-mill treatment with carbon.

4. A process according to claim 1, wherein the modified layer is formed by modifying the protective layer by calcining the protective layer at a temperature of 100° C. to 300° C.

5. A process according to claim 1, further comprising forming a lubricating layer on the modified layer.

6. A process according to claim 5, wherein said concavities and convexities are formed by dry-etching the protective layer under stream of oxygen gas with discharging alternating current after having coated randomly with resin particles to form a microscopic masking on the protective layer.

7. A process according to claim 6, wherein said concavities and convexities formed are further subjected to dry-etching under stream of a noble gas, thereby the modified layer having hydrophobicity is formed on the protective layer.

8. A process according to claim 7, wherein said dry-etching under stream of a noble gas is carried out with leaving the microscopic masking on surface of convexities of the modified layer.

9. A process according to claim 8, wherein the lubricant layer is formed on surface of the modified layer after having removed the microscopic masking left on surface of convexities of the modified layer.

10. A magnetic recording medium produced according to claim 9.

11. A process according to claim 8, wherein said microscopic masking is a polytetrafluoroethylene.

12. A process according to claim 8, wherein said microscopic masking is a perfluoropolyether, and said perfluoropolyether is used as a lubricant.

13. A process according to claim 1, wherein said concavities and convexities are formed by dry-etching the protective layer using an etching gas containing oxygen after being coated randomly with resin particles to form a microscopic masking on the protective layer.

14. A process according to claim 13, wherein the etching gas consists essentially of oxygen.

15. A process according to claim 13, wherein the dry-etching is carried out under a stream of oxygen gas with discharging alternating current.

16. A process according to claim 1, wherein the forming of the protective layer on the magnetic layer includes forming the protective layer containing as a major component carbon on the magnetic layer, the forming of a number of concavities and convexities on the surface of the protective layer includes applying a great number of microscopic particles of a resin on a surface of the protective layer and etching the protective layer using the microscopic particles of the resin as a masking material, and subsequently forming a modified layer having hydrophobicity on the protective layer includes etching further the thus etched protective layer under a stream of a noble gas so as to enhance hydrophobicity of a surface of the concavities and convexities.

17. A process for producing a magnetic recording medium which comprises:

forming a magnetic layer on a substrate;

forming a protective layer containing as a major component carbon on the magnetic layer;

applying a great number of microscopic particles of a resin on a surface of the protective layer;

etching the protective layer using the microscopic particles of the resin as a masking material so as to form a number of concavities and convexities thereon; and etching further the thus etched protective layer under stream of a noble gas so as to enhance hydrophobicity of a surface of concavities and convexities.

18. A process according to claim 17, wherein said microscopic masking is a polytetrafluoroethylene, and the etching for forming concavities and convexities is carried out by applying alternating current discharge to the protective layer under stream of oxygen gas.

19. A process according to claim 17, wherein etching under stream of a noble gas is carried out with leaving said microscopic masking on surface of the convexities.

20. A process according to claim 19, further comprises removing the microscopic masking left on the protective layer, and coating a lubricant on the protective layer so as to form a lubricant layer on the protective layer.

21. A process according to claim 19, wherein the microscopic masking is a perfluoropolyether, and the microscopic masking is left as it is so as to form a lubricant layer therefrom.

22. A magnetic recording medium producing according to claim 17.

23. A process according to claim 17, wherein the resin used as a masking material is a polytetrafluoroethylene and the concavities and convexities are formed by dry etching using an etching gas containing oxygen.

24. A process for producing a magnetic recording medium which comprises:

forming a magnetic layer on a substrate;

forming a protective layer containing as a major component carbon on the magnetic layer;

etching the protective layer using a masking material so as to form a number of concavities and convexities thereon; and etching further the thus etched protective layer under a stream of a noble gas so as to enhance hydrophobicity of a surface of concavities and convexities.

* * * * *